United States Patent [19]
Kinoshita et al.

[11] 4,411,504
[45] Oct. 25, 1983

[54] FOCUS DETECTING SYSTEM

[75] Inventors: Takao Kinoshita, Tokyo; Kazuya Hosoe, Kunitachi; Masayoshi Yamamichi, Kawasaki, all of Japan

[73] Assignee: Canon Kabushiki Kaisha, Tokyo, Japan

[21] Appl. No.: 313,583

[22] Filed: Oct. 21, 1981

[51] Int. Cl.³ .............................................. G03B 7/08
[52] U.S. Cl. ...................................... 354/25; 354/31; 354/59
[58] Field of Search .......................... 354/25, 31 F, 59

[56] References Cited
U.S. PATENT DOCUMENTS 3,532,045 10/1970 Genahr .
4,277,156 7/1981 Fukushima et al. .
4,333,716 6/1982 Saltane et al. ........................ 354/25
4,349,254 9/1982 Jyojiki et al. ........................ 354/31

FOREIGN PATENT DOCUMENTS 51-147336 12/1976 Japan .
53-79425 7/1978 Japan .
55-106421 8/1980 Japan ..................... 354/25

Primary Examiner—Russell E. Adams
Attorney, Agent, or Firm—Fitzpatrick, Cella, Harper & Scinto

[57] ABSTRACT

A focus detecting system is disclosed which detects a focusing state of an imaging optical system with respect to an object on the basis of signals, of the image formed by the optical system, generated from three light-receiving sections which are disposed at positions substantially corresponding to points in front of, on and behind a predetermined focal plane of the optical system. A substantial range of detection of the light-receiving section among the three light-receiving sections which is disposed at a point substantially corresponding to the predetermined focal plane is limited to be narrower than those of the remaining two light-receiving sections.

26 Claims, 24 Drawing Figures

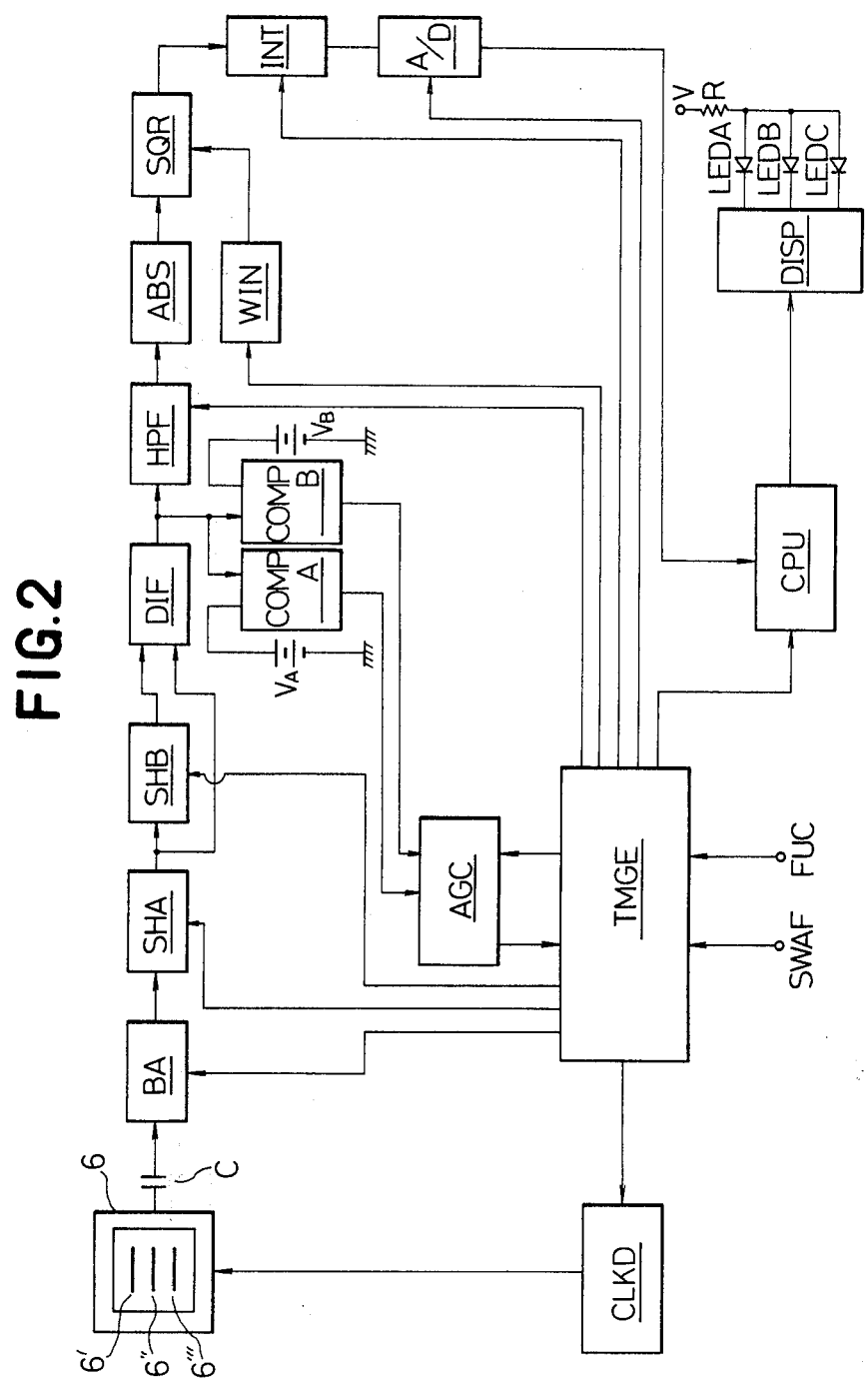

FOCUS DETECTING SYSTEM

BACKGROUND OF THE INVENTION

1. Field of the Invention

The present invention relates to a focus detecting system and, more particularly, to a focus detecting system for detecting a focusing state of an imaging optical system on the basis of signals, of an image formed by the optical system, generated from three light-receiving sections which are disposed at positions substantially corresponding to points in front of, on and behind a predetermined focal plane of the optical system.

2. Description of the Prior Art

Several focus detecting systems have been proposed in, for example, U.S. Pat. No. 3,532,045 (corresponding German DOLS No. 15 47 457); U.S. Pat. No. 4,277,156 (corresponding German DOLS No. 29 23 573); and Japanese Laid-Open patent applications No. 7336/1976, No. 79425/1978 and No. 106421/1980, which are capable of detecting a focusing state of an imaging optical system on the basis of signals, of an image formed by the optical system, generated from three light-receiving sections disposed at positions substantially corresponding to points in front of, on and behind a predetermined focal plane of the optical system.

When an image of an object is at the boundary of a light-receiving section of a photoelectric transducer element or a predetermined detection range (the field of view) within which substantial signal processing is performed by an electric signal processing system, various transient states are caused when the image enters or leaves the field of view, resulting in unstable focus detection signals. Especially with systems which compare the sharpness of the images for focus detection, errors at the edge of the field of view due to a difference in the sharpness or magnification of the image are big factors for causing errors in focus detection. This is, however, inherent in focus detecting systems of this type. It is desired to eliminate this phenomenon in order that stable focus detection can be performed constantly and without errors.

SUMMARY OF THE INVENTION

The present invention has been made with a view towards eliminating the above phenomenon. It is an object of the invention to provide a focus detecting system for detecting a focusing state of an imaging optical system on the basis of signals, of an image formed by the optical system, generated from three light-receiving sections which are disposed at positions substantially corresponding to points in front of, on and behind a predetermined focal plane of the optical system, wherein the problems of the conventional systems as described above, that is, unstable focus detection signals due to the transient phenomena in the case where the image enters or leaves the detecting field of view, can be eliminated, so that stable focus detection can be performed constantly and without errors.

In order to achieve the above and other objects, there is provided according to an improvement of the present invention a focus detecting system wherein a detection range (field of view for detection) of one light-receiving section among three light-receiving sections, is disposed at a point substantially corresponding to the predetermined focal plane of the optical system and is constructed to be narrower than those of the remaining two light-receiving sections.

According to one preferred embodiment of the present invention which will be described hereinafter, there is provided a focus detecting system which limits the discrimination of the focusing state in response to a signal generated by an output from the light-receiving section which is disposed at a position substantially corresponding to the predetermined focal plane of the optical system, whereby generation of an erroneous output can be prevented and stable focus detection can be constantly performed without errors.

As a method for making the substantial detecting range of the one light-receiving section smaller than those of the remaining two light-receiving sections, there may be adopted a method of making the light-receiving section small physically or optically, a method of making the range of signal-processing of a signal processing system for processing output signals from the light-receiving section small, and so on. These methods will be described in more detail.

Other objects and features of the present invention will become apparent from the following description when taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are model views for explaining the principle of a focus detection operation of an example from a focus detecting system to which the present invention may be applied, wherein FIG. 1A shows the optical arrangement of the focus detecting system, FIG. 1B shows the configuration of light-receiving sections of a photoelectric transducer element shown in FIG. 1A, and FIG. 1C shows changes in sharpness of the image at three points in FIG. 1A;

FIG. 2 is a block diagram showing the configuration of electric circuitry of an embodiment of a focus detecting system according to the principle shown in FIGS. 1A to 1C;

FIGS. 9 and 10 are views for explaining the focus detecting system according to the improvement of the present invention, wherein FIG. 9 shows how an error is generated by changes in the focus detection signals when the image is at the boundary of as compared with at the center of the field of view, and FIG. 10 shows how an erroneous operation is caused by a difference in the magnification which results from the arrangement of the three light-receiving sections spaced in the direction along the optical axis of the optical system;

DETAILED DESCRIPTION OF THE PREFERRED EMBODIMENTS

Figure 1A:
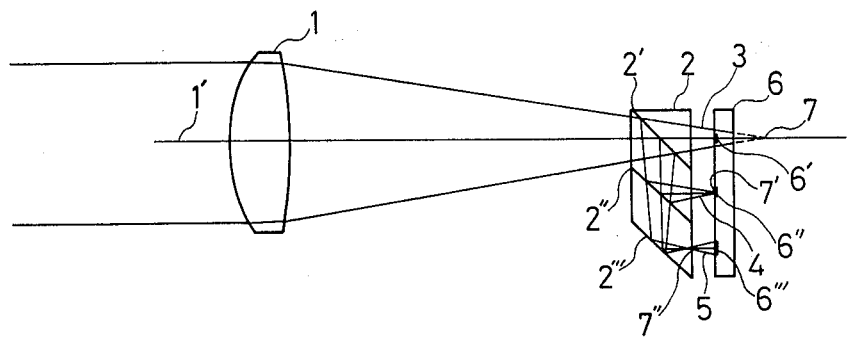

Referring to FIG. 1A, an imaging lens 1 has an optical axis 1'. A beam splitter 2 is arranged in the optical path of the imaging lens 1 and has semi-transmittal sections 2' and 2" and a total reflection section 2'''. Light emerging from the imaging lens 1 becomes incident on the semi-transmittal section 2', and is then divided by the semi-transmittal section 2" and the total reflection section 2''' into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy for the three divided light rays 3, 4 and 5 becomes substantially the same. A photoelectric transducer 6 has three light-receiving sections 6', 6" and 6'''.

If the convergent point of the light ray 3 is at point 7, it is easily seen that the convergent points of the divided light rays 4 and 5 are at points 7' and 7", respectively. If the convergent point 7 of the light ray 4 which is reflected and divided by the semi-transmittal sections 2' and 2" coincides with the light-receiving section 6", the convergent point 7 of the light ray 3 incident on the light-receiving section 6' is located behind the light-receiving section 6', and the convergent point 7" of the light ray 5 incident on the light-receiving section 6''' is located in front of the light-receiving section 6'''. The deviations of these converging points from the light-receiving sections become the same if the distances between the semi-transmittal sections 2' and 2" and between 2" and the total reflection section 2''' are equal to each other. As a result, the sharpness of the image on the light-receiving section 6" becomes maximum, and the sharpnesses of the images on the light-receiving sections 6' and 6''' become low but are similar to each other.

Figure 1B:
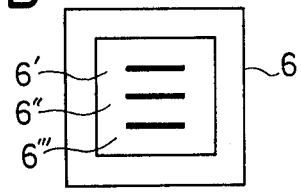
Figure 1C:
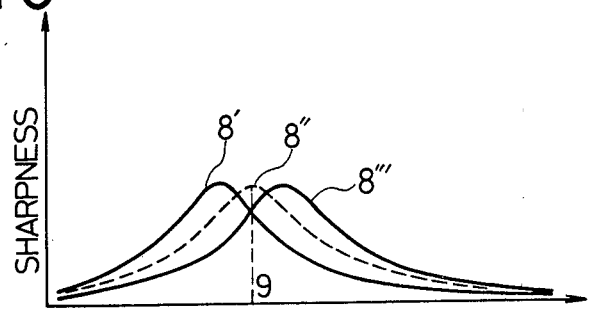

If the imaging lens 1 is displaced along the optical axis 1', the sharpnesses of the images on the light-receiving sections 6', 6" and 6''' change as shown in FIG. 1C. Curves 8', 8" and 8''' representing changes in the sharpnesses of the images on the light-receiving sections 6', 6" and 6''' form peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to coincide substantially with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6''' are represented by the point 9 in FIG. 1C. Then, it is apparent from FIG. 1C that the relationships between the sharpnesses 8' and 8''' are inverted according to whether the imaging plane surface of the lens 1 is in front of or behind the light-receiving section 6". In this manner, the near-focus state and the far-focus state can be detected.

FIG. 1B is a front view of the photoelectric transducer 6 wherein the respective light-receiving sections 6', 6" and 6''' comprise, for example, belt-shaped linear CCDs. However, the shape of the light-receiving sections is not necessarily limited to this shape.

A focus detecting system is thus obtained which has the beam splitter 2 and the photoelectric transducer 6 with the three light-receiving sections 6', 6" and 6'''. FIG. 2 shows a block diagram of an electric circuit which reads image signals from the light-receiving sections 6', 6" and 6''', extracts sharpness signals, and discriminates the magnitudes of sharpness of the image at three points. Many of the blocks shown in FIG. 2 are of known a configuration and details of them are shown in a series of applications as in U.S. patent application Ser. No. 59,635, "Focal Detecting System", Kinoshita et al, filed on July 23, 1979 (corresponding German DOLS 29 30 636), U.S. patent application Ser. No. 151,703, "Image Sharpness Detecting System", Kawabata et al, filed on May 20, 1980 (corresponding German patent application No P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6" and 6'''. A series of clock signals for operating the CCD 6 are supplied from a clock driver CLKD. These clock signals are supplied to initiate a series of operations of the CCD 6 such as integration, transfer, resetting and so on in a predetermined order. The charge stored for a predetermined period of time in the CCD 6 is charge-voltage converted at the output of the CCD 6 and is thereafter input, as an image signal, to a balance adjusting circuit BA through a capacitor C for suppressing noise. These image signals corresponding to the three light-receiving sections 6', 6" and 6''' of the CCD 6 are time-serially read out in an order which is determined by the configuration of the CCD 6.

Figure 3:
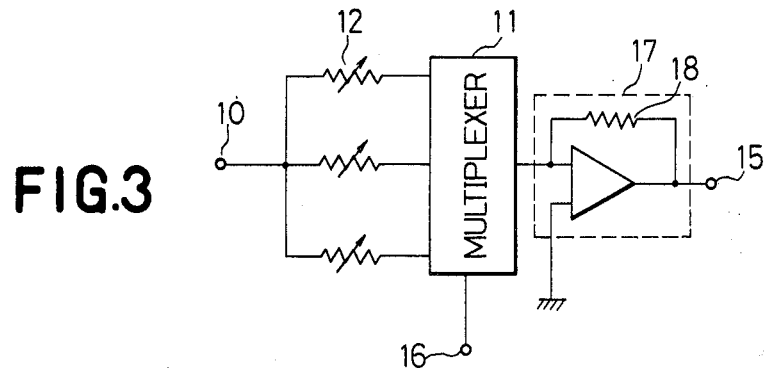
FIG. 3 is a partial circuit diagram showing an example of a balance adjusting circuit shown in the circuitry of FIG. 2.

The balance adjusting circuit BA, as shown in FIG. 3, has a multiplexer 11 of a known configuration and three variable resistors 12, 13 and 14. Referring to FIG. 3, the image signal as described above is supplied to the multiplexer 11 through the variable resistors 12, 13 and 14. In response to a synchronizing signal received from a terminal 16, the multiplexer 11 receives the image signals corresponding to the respective light-receiving sections 6', 6" and 6''' through the variable resistors 12, 13 and 14, respectively, and outputs them to an amplifier 17. The variable resistors 12, 13 and 14 control the balance of the image signals from the light-receiving sections 6′, 6″ and 6‴. The outputs from the resistors 12, 13 and 14 are input through the multiplexer 11 to the amplifier 17 where the gains of the respective images are controlled according to their ratios by a feeding resistor 18, and then are input to the next electric circuit. Balance adjustment of the image signals is useful when there is an imbalance in the three light rays 3, 4 and 5 divided by the beam splitter 2. The synchronizing signal is supplied at the terminal 16 from a timing generator TMGE. Although three variable resistors are used in this embodiment, two variable resistors may be used to balance two image signals in relation to the remaining image signal.

Signal processing in this circuitry must be performed according to a series of synchronizing signals which are supplied from the timing generator TMGE. In response to an operation command signal SWAF of the circuitry (a signal generated in synchronism with the depression of a shutter release button to the first position in the case of a camera) and a power clear signal PUC, the timing generator TMGE generates the various sychronizing signals to the respective blocks in the circuitry in a predetermined order. The timing generator TMGE may be of a known configuration and need only generate the group of synchronizing signals suitable for the operation of the circuitry of this embodiment. The clock divider CLKD also operates in response to the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD are influenced by the dark current since the actual CCD comprises a semiconductor. Therefore, the actual image signal includes the dark current level superposed on the signal corresponding to the actual amount of incident light. Thus, the image signal as it is contains a noise component. Part of the light-receiving section of the CCD is masked with an aluminum mask or the like, and a signal output from this part is considered to be the dark current level. Then, the difference is obtained between the output from the unmasked light-receiving section and the output of the masked part (to be referred to as a dark current bit hereinafter), that is, the dark current level, to remove the influence of the dark current. The dark current bit (not shown) is included at the end of each of the light-receiving sections 6′, 6″ and 6‴ of the CCD 6, so that this bit is output first. A second sampling and holding circuit SHB samples and holds the output level of these dark current bits. The second sampling and holding circuit SHB receives commands from the timing generator TMGE for holding the output level. A differential amplifier DIF receives the output signal from the sampling and holding circuit SHA and the output signal from the sampling and holding circuit SHB and takes the difference between these two inputs. The image signals obtained as the output of the differential amplifier DIF are signals whose dark current level is cancelled and which correctly correspond to the amount of incident light.

The output of the differential amplifier DIF is input to a high-pass filter HPF and to two comparators COMPA and COMPB. A reference voltage VA is supplied to the comparator COMPA and a reference voltage VB is supplied to the comparator COMPB. These comparators COMPA and COMPB constitute a window comparator.

Figure 4:
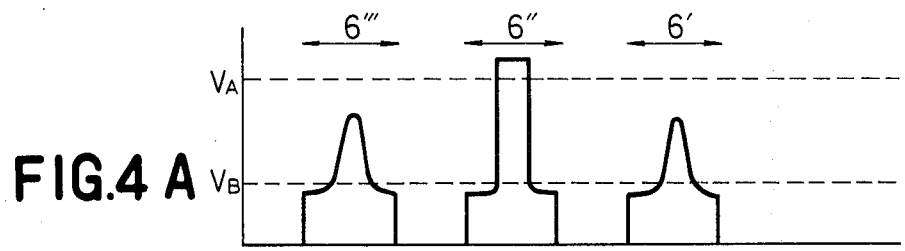
FIGS. 4A to 4C show signal waveforms for explaining the function of a window comparator shown in FIG. 2, which discriminates if the accumulating time is appropriate.
Figure 4:
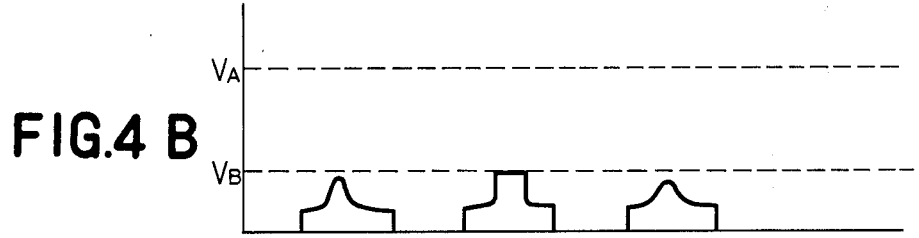
Figure 4:
Figure 5:
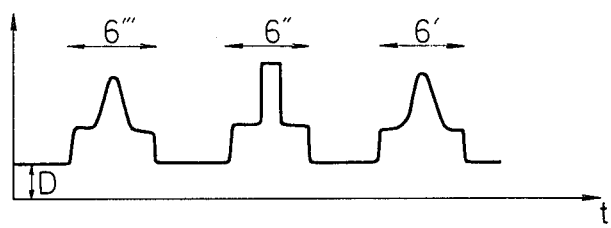
FIGS. 5A to 5F show output waveforms of the outputs of the main blocks of the circuitry shown in FIG. 2.
Figure 5:
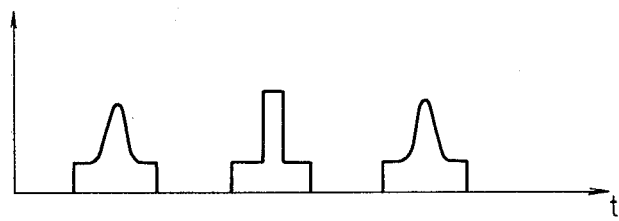
Figure 5:
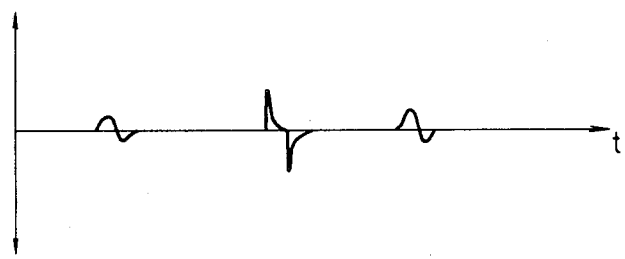
Figure 5:
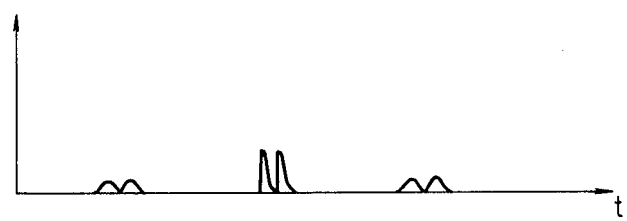
Figure 5:
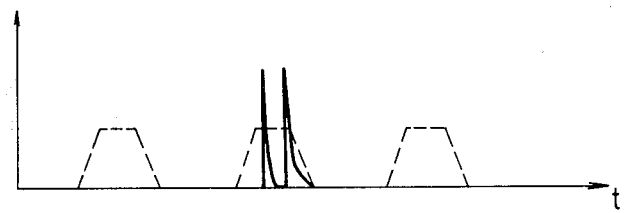
Figure 5:
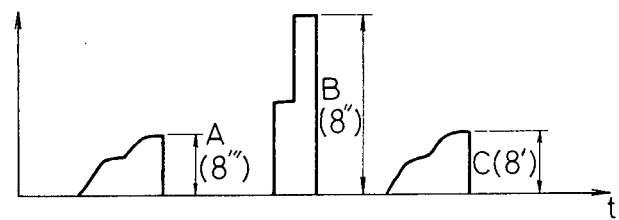

The mode of operation of the window comparator will now be described with reference to FIGS. 4A–4C. FIGS. 4A, 4B and 4C show the relationship between the peak value of the image signal compensated for the dark current level (to be referred to as the dark current-compensated image signal hereinafter) and the reference voltages VA and VB, the time being plotted as the abscissa and the voltage being plotted as the ordinate. The ranges in FIG. 4A indicated by arrows at 6‴, 6″ and 6′ represent the timings with which the image signals are output from the light-receiving sections 6‴, 6″ and 6′, respectively. In FIG. 4A, part of the dark current-compensated signal (part of 6″) exceeds the reference voltages VA and VB, and the signal level is too high. In this case, the outputs of both the comparators COMPA and COMPB are at high level. In FIG. 4B, the dark current-compensated signal is lower than the reference voltage VB and the signal level is too low. In this case, the outputs of both the comparators COMPA and COMPB are at low level. In FIG. 4C, the peak value of the dark current-compensated signal is between the reference voltages VA and VB and is at a suitable level. In this case, only the output of the comparator COMPB is at high level, and the output of the comparator COMPA is at low level. If the reference voltages VA and VB are so selected to set the suitable level of the dark current-compensated signal, the combination of the high or low level of the outputs of the comparators COMPA and COMPB indicates the appropriateness of the dark current-compensated signal level. IF VA>VB in this embodiment, when the outputs of both the comparators COMPA and COMPB are at high level, it indicates that the dark current-compensated signal is at too high level including saturated level. When the outputs of both the comparators COMPA and COMPB are at low level, it indicates that the dark current-compensated signal level is too low. Only when the output of the comparator COMPA is at low level and the output of the comparator COMPB is at high level, it indicates that the dark current-compensated signal is at a suitable level.

The outputs of the comparators COMPA and COMPB are supplied to an accumulating time control circuit AGC for maintaining the appropriate dark current-compensated signal level by shortening the accumulating time of the CCD 6 when it is too high and by prolonging the accumulating time when it is too low. In response to a synchronizing signal from the timing generator TMGE, the integrating time control circuit AGC operates so that it may be able to discriminate the state of the outputs of the comparators COMPA and COMPB at the timing at which the dark current-compensated signals are output from the light-receiving sections 6′, 6″ and 6‴. Based on the output state of the comparators COMPA and COMPB, the accumulating time control circuit AGC outputs a command signal to shorten or prolong the accumulating time to the timing generator TMGE. In response to the command signal, the timing generator TMGE so operates the clock driver CLKD that the accumulating time of the CCD 6 may be shortened or prolonged at the next output from the CCD 6.

The high-pass filter HPF evaluates the degree of change in the image. The high-pass filter extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6" and 6''' of the CCD 6 are input. This is to prevent the generation of an output from the light-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (dark to bright and bright to dark), if the output of the high-pass filter HPF were directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may utilize, for example, nonlinear input/output characteristics of a semiconductor. The function of the squaring circuit SQR in this circuitry is to emphasize and to evaluate the peak output of the high-pass filter HPF, that is, the state wherein the change of the image signal with time is great and the sharpness is high. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters inside the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6', 6" and 6''' of the CCD 6, the window function generating circuit WIN controls the gain of the squaring circuit according to the relationship determined in correspondence with the location (location in the field of view).

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6', 6" and 6'''. In this manner, the output of the integrating circuit INT corresponds to the electric output such as the sharpness of the respective images corresponding to the order of output from the light-receiving sections 6', 6" and 6''' of the CCD 6.

The analog output of the integrating circuit INT is input to an A-D converting circuit A/D for conversion into a digital value so that the signal processing may be facilitated for discrimination at a central processing unit CPU of an in-focus state, a near-focus state, and a far-focus state of the imaging lens 1.

FIGS. 5A–5F show the output waveforms of the respective blocks of the circuitry in order to clarify the analog processing of the series of signals representing the sharpness of the image, starting from the read-out of the image signals from the light-receiving sections 6', 6" and 6''' of the CCD 6 (the field of view for the three images) until the integration at the integrating circuit INT. In FIGS. 5A–5F, time is plotted as the abscissa and the voltage or current output is plotted as the ordinate in arbitrary units. The ranges indicated at arrows 6', 6" and 6''' in FIG. 5 represent the timings with which the signals corresponding to the light-receiving sections 6', 6" and 6''' of the CCD 6 are output and processed. The state of the respective images corresponds to the in-focus state of the imaging lens 1 in which the sharpness of the image of the light-receiving section 6" is highest, that is, the sharpness as shown at 9 in FIG. 1C is highest. FIG. 5 shows the state of the signal output from the CCD 6 only once, but these signals are repeatedly output in practice.

FIG. 5A shows the image signal which is output from the CCD 6 and has passed through the sampling and holding circuit SHA. The order for output of the images from the light-receiving sections is 6''', 6'' and 6'. The voltage indicated by letter D is the dark current level, which is first output and is held by the sampling and holding circuit SHB. FIG. 5B shows the output of the differential amplifer DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by the broken lines show the manner in which the gain of the squaring circuit SQR changes within the field of view according to the shape of the window generated by the window function generating circuit WIN described above. FIG. 5E shows the output of the integrating circuit INT wherein levels A(8'''), B(8'') and C(8') correspond to the sharpnesses of the images on the light-receiving sections 6''', 6'' and 6', respectively. Specifically, A, B and C in FIG. 5F correspond to the levels of the curves 8''', 8'' and 8' of FIG. 1C at the point 9.

The levels A, B and C are converted into digital data by the A-D converting circuit A/D described above and are input to the central processing circuit CPU. The CPU computes the relationships among the levels A, B and C according to the conditions of the in-focus state, the near-focus state, the far-focus state, and the interruption of the discrimination which are set in advance. Basically, in the in-focus state, conditions B>A, B>C and A=C are satisfied. In the near-focus state, condition C>A is satisfied, and in the far-focus state, condition A>C is satisfied. The CPU discriminates which set of conditions is satisfied and outputs a signal corresponding to one of these three states. As the algorithm for the discrimination at the CPU may be adopted the algorithm as disclosed in U.S. patent application Ser. No. 151,533, "Focus Detecting System", Sakai et al, filed on May 19, 1980 (corresponding German patent application No. P 30 19 901.0) of the same assignee or in the U.S. Pat. Application which is to be filed on Oct. 16, 1981 by Shinji Sakai, Nobuhiko Shinoda, Takao Kinoshita, Kazuya Hosoe and Takashi Kawabata (corresponding Japanese patent application No. 144,782/1980).

The output of the central processing circuit CPU is input to the display circuit DISP. The display circuit DISP basically comprises a logic circuit and a drive circuit for driving indicators such as LEDs. In accordance with the commands from the central processing circuit CPU, in this embodiment, the display circuit DISP lights up the light-emitting diode LEDB in the case of in-focus state, and lights up the light-emitting diodes LEDC and LEDA, respectively, in the cases of near-focus and far-focus states to indicate that the imaging lens 1 in the in-focus, near-focus or far-focus state. A protective resistor R is incorporated to protect the LEDA to LEDC when a voltage V is supplied to them. Although LEDs are used in this embodiment, liquid crystal display devices, electrochromies or the like may be used.

Figure 15:
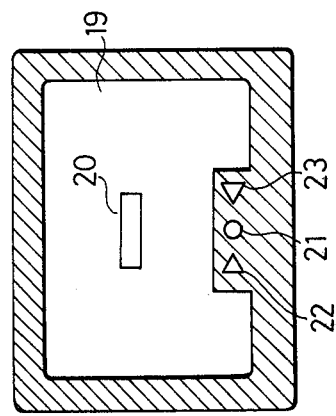
FIG. 15 is a view showing an example of a display when the focus detecting system of the present invention is applied to a camera.

FIG. 15 shows a focus detection display suitable for focusing of the photographic lens of a camera, which involves a range finder field frame 19 of the camera, a field mark 20 representing the location of the field of view, and a mark 21 representing the in-focus state of the photographic lens. The light-emitting diode LEDB shown in FIG. 2 is arranged immediately behind the mark 21. Arrow marks 22 and 23 (arrows represent the direction of rotation of a distance dial of the photographic lens for relocating it from the out-of-focus position to the in-focus position) represent the near-focus state and the far-focus state, respectively. The light-emitting diodes LEDC and LEDA shown in FIG. 2 are arranged immediately behind the arrow marks 22 and 23, respectively. In this manner, the operator is capable of confirming the focusing state of the photographic lens simply by observing which one of these marks is lit. If the mark 21 representing the in-focus state is lit, the focusing operation is interrupted. If the arrow mark 22 or 23 is lit, the distance dial need only be rotated in the direction indicated by the arrow mark 22 or 23, respectively, until the in-focus mark 21 is lit.

The configuration of the timing generator TMGE will be described with reference to FIGS. 6 and 7.

Figure 6:
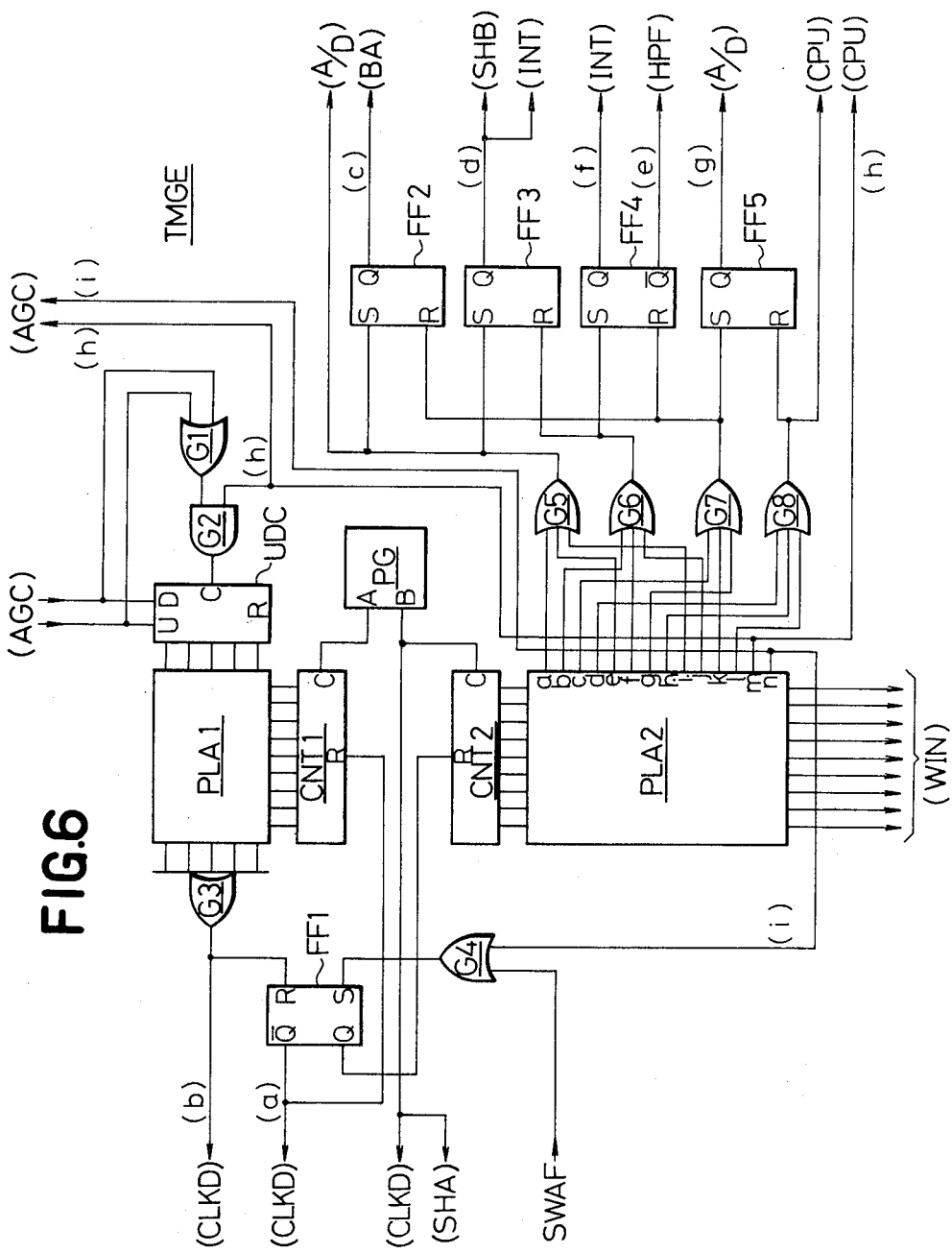
FIG. 6 is a block diagram showing the configuration of a timing generator in the circuitry shown in FIG. 2.

Referring to FIG. 6, the part of the circuitry consisting of an up/down counter UDC, a counter CNT1, a programmable logic array PLA1 and OR gates G1 to G3 mainly serves to regulate the accumulating time of the CCD 6. The up/down counter UDC is set in the up-counting mode in response to an accumulating time shortening command from the accumulating time control circuit AGC and is set in the down-counting mode in response to an accumulating time prolonging command therefrom. The up/down counter UDC is so controlled to count one pulse at a predetermined timing to be described later to set a different accumulating time only if an accumulating time change command is output from the accumulating time control circuit AGC. The CNT1 counts a pulse train A from a pulse generator PG. When the count of the counter CNT1 reaches a predetermined value which is set by the output of the up/down counter UDC, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the output of the signals from the CCD 6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\overline{Q}$ output of the RS flip-flop FF1 as shown in FIG. 7(a) is supplied as a control signal to the clock driver CLKD. The CCD 6 has an overflow drain gate which is opened or closed according to the $\overline{Q}$ output of the RS flip-flop FF1 (the gate is opened when the $\overline{Q}$ output is at high level and is closed when it is at low level) to control the integration of the signal charge by the CCD 6. The interval shown in FIG. 7(a) in which the $\overline{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the up/down counter UDC, the accumulating time of the signal charge of the CCD 6 is regulated by the output of the up/down counter UDC. The $\overline{Q}$ output of the RS flip-flop FF1 is supplied to the counter CNT1 as a reset signal. Therefore, the counter CNT1 performs counting only during the interval in which the Q output of the flip-flop FF1 is at low level and is kept reset in other conditions.

The circuitry part consisting of a counter CNT2, a programmable logic array PLA2, OR gates G5 to G8, and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) are in one-to-one correspondence. The pulse train B is also supplied to the sampling and holding circuit SHA as the sampling pulse. The content of the programmable logic array PLA2 is so programmed that, based on the count output from the counter CNT2, pulses are generated from terminals a to n at the respective timings shown in FIGS. 7(a) to 7(n) after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminal of the RS flip-flop FF5. In response to the outputs from the terminals d, h and l of the programmable logic array PLA2, the OR gate G8 produces an output which is supplied to the reset terminal of the RS flip-flop FF5. The Q outputs of the RS flip-flop FF2 to FF5 and the $\overline{Q}$ output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\overline{Q}$ output (FIG. 7(e)) of the RS flip-flop FF4 corresponds to the effective image signal bit of the outputs of each of the light-receiving sections 6''', 6'' and 6', and is supplied to the high-pass filter HPF as a reset signal. In this manner, the high-pass filter HPF is released from the reset condition only during the low level interval of the $\overline{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D converting circuit A/D as an A-D conversion command. The output of the OR gate G5 is supplied to the A-D converting circuit A-D as a reset signal. The output of the OR gate G3 is supplied to the central processing circuit CPU as a strobe pulse for storing the output from the A-D converting circuit A/D. The output (FIG. 7(h)) from the terminal m of the programmable logic array PLA2 is supplied to the AND gate G2 as a count pulse of the up/down counter UDC as well as to the accumulating time control circuit AGC and the central processing unit CPU as a latch pulse for latching the outputs thereof. The output (FIG. 7(i)) from the terminal n of the programmable logic array PLA2 is supplied to the OR gate G4 as a set signal of the RS flip-flop FF1 as well as to the accumulating time control circuit AGC as a reset signal for the flip-flop therein. The Q output of these flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(j). The window function generating circuit WIN may be of the configuration as disclosed in U.S. patent application Ser. No. 151,703, filed on May 20, 1980 by Kawabata et al (corresponding German patent application No. P 30 19 908.7) of the assignee of the present invention.

Figure 7:
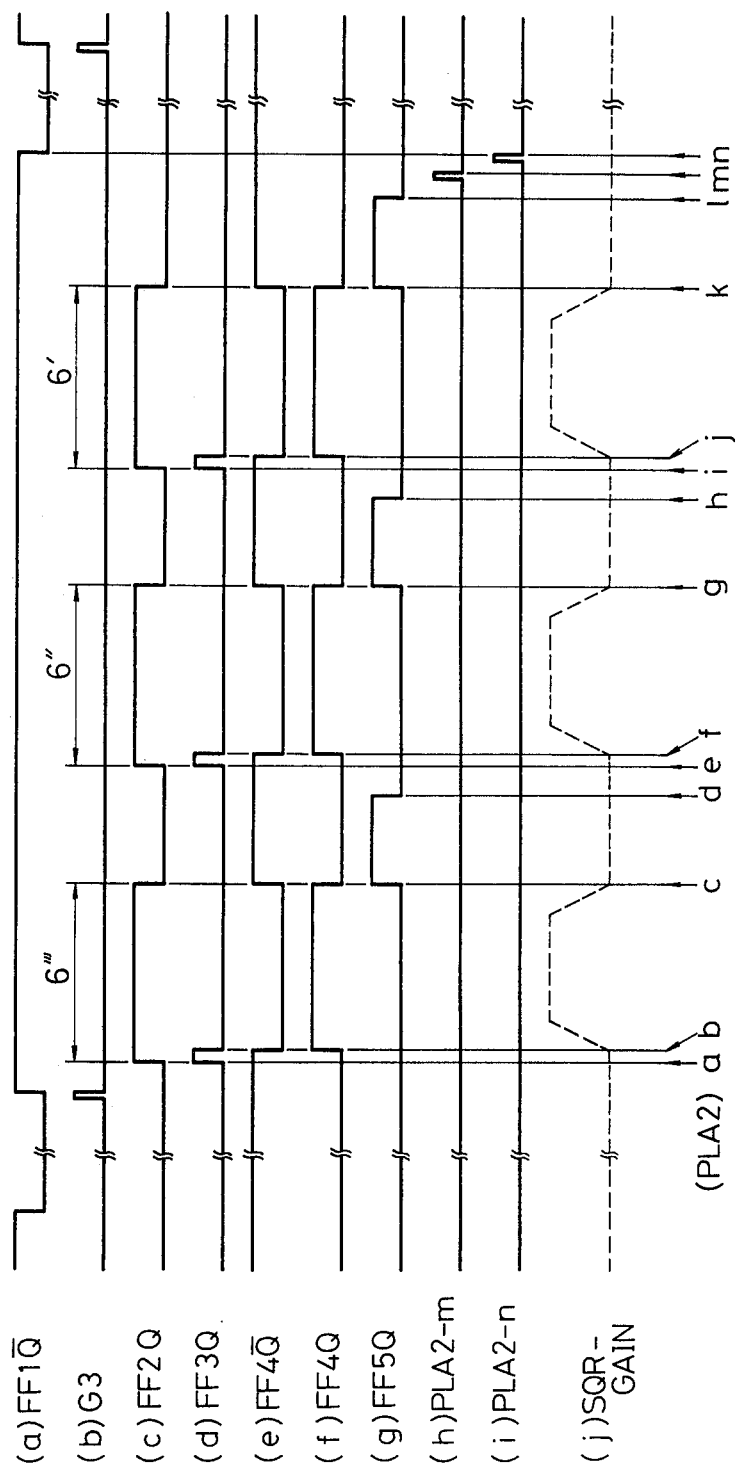
FIG. 7 is a timing chart showing timing signals for controlling various operations which are output from the timing generator shown in FIG. 6.
Figure 8:
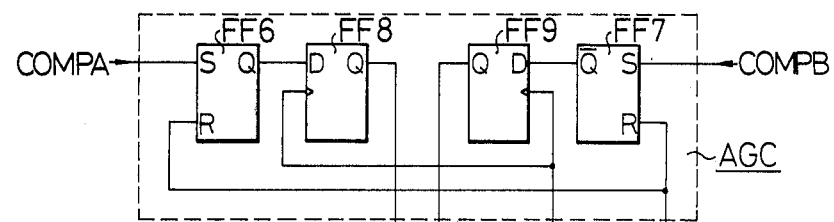
FIG. 8 is a block diagram showing the configuration of the accumulating time control circuit in the circuitry shown in FIG. 2.

Describing next the configuration of the accumulating time control circuit AGC, referring to FIG. 8, an RS flip-flop FF6 is set by an output of high level of the comparator COMPA, and an RS flip-flop FF7 is set by an output of high level of the comparator COMPB. Both of these RS flip-flops FF6 and FF7 are reset by an output (FIG. 7(i)) of high level from the terminal n of the programmable logic array PLA2 in the timing generator TMGE shown in FIG. 6. In response to an output (FIG. 7(h)) of high level from the terminal m of the programmable logic array PLA2 in the timing generator TMGE, a D flip-flop FF8 latches the Q output of the RS flip-flop FF6, and a D flip-flop FF9 latches the $\overline{Q}$ output of the RS flip-flop FF7. A high level of the Q output from the D flip-flop FF8 represents the shortening of the accumulating time, and a high level of the Q output of the D flip-flop FF9 represents the prolongation of the accumulating time. These outputs are supplied to count mode setting terminals U and D of the up/down counter UDC in the timing generator TMGE shown in FIG. 6.

The improvement of the focus detecting system according to the present invention will now be described.

Figure 9:
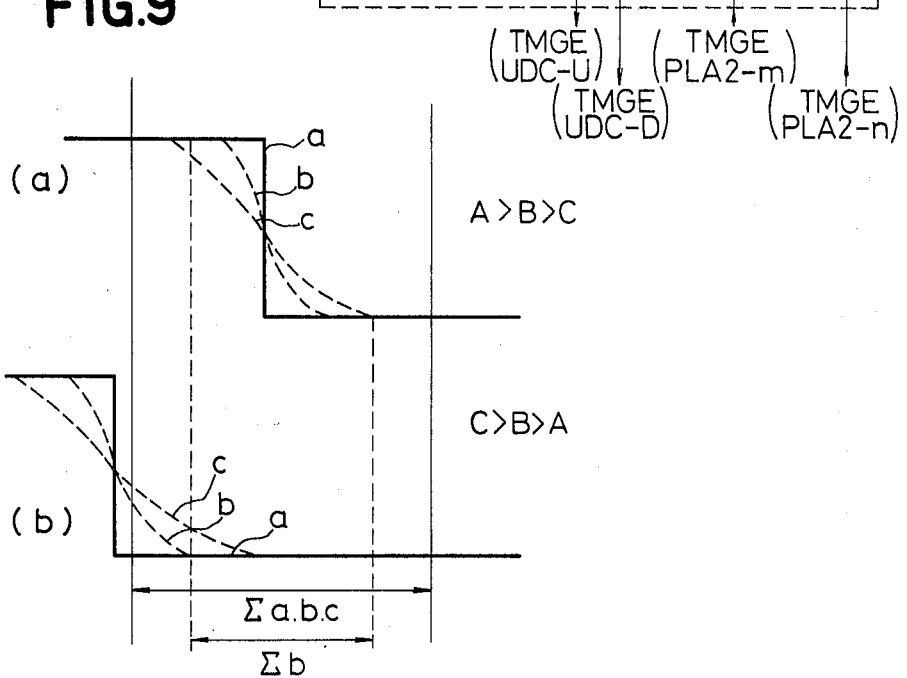

FIG. 9 shows how an error is generated by changes in focus detection signals when an image is at the boundary of as compared with at the center part of the field of view. In FIG. 9, the part (a) shows the case wherein images a, b and c received by the three light-receiving sections 6', 6'' and 6''' are at the center of the detecting field of view and the sharpness of these images becomes less in the order of images a, b and c. When focus detection signals in such case are denoted by A, B and C, the relation will apparently be: A>B>C. When the images slightly deviate from the boundary of the field of view as shown in the part (b) in FIG. 9, the sharpness can be discriminated higher in the order of images c, b and a even under the same conditions in the field of view, so that C>B>A. As a result, when the images pass through the boundary of the field of view while the sharpness of the three images a, b and c remains unchanged, the results of the focus detection are different from those obtained when the images are at the center part of the field of view. In FIG. 9, the mark "Σa, b, c" indicates that the detecting fields of view for the images a, b and c are identical with each other.

Figure 10:
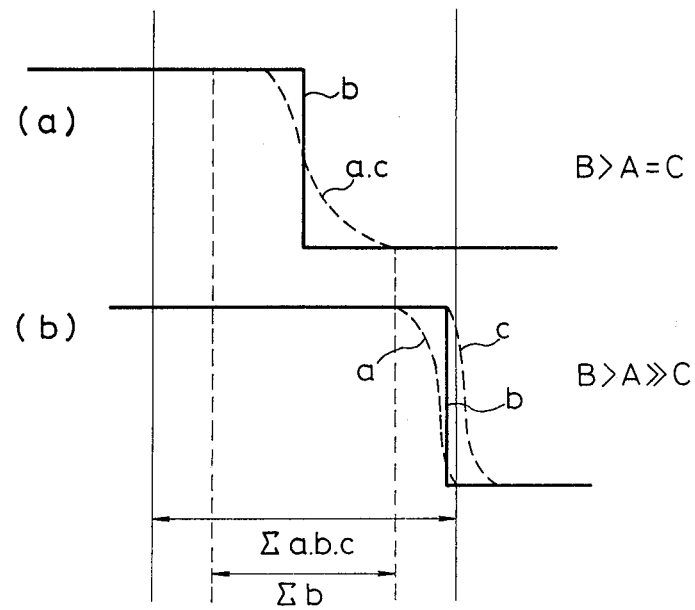

The erroneous operation, which is caused due to a difference in the magnification which results from the arrangement of the three light-receiving sections 6', 6'' and 6''' spaced from each other in the direction along the optical axis of the optical system, will be described with reference to FIG. 10. In FIG. 10, the part (a) shows the case wherein b>a=c, and there is a difference in the sharpness of the three images a, b and c. In this case, it is apparent that B>A=C. However, when the images have moved toward the boundary of the field of view, it is as if the images a, b and c were separated, due to the difference in magnification. This is shown in the part (b) in FIG. 10. In this case, since the focus detection signal C of the image c is extremely small, the relation will be: B>A>>C. Thus, while the in-focus state can be indicated in the case of FIG. 10(a), the near-focus state may be indicated since B>C in the case of FIG. 10(b). Although the relative distances between the three light-receiving sections 6', 6'' and 6''' are small and do not, therefore, present big problems, such an error may not be negligible in a case as in FIG. 9. Taking this into consideration, in the embodiment of the present invention, the field of view Σb of the light-receiving section 6'' which is disposed at a position in substantial correspondence with the predetermined focal plane of the optical system is narrowed as compared to the fields of view Σa and Σc of the remaining two light-receiving sections 6' and 6'''. In addition to this, the discrimination of the focusing state is limited in accordance with the value of the focus detection signal B to suppress effectively any erroneous detection. For example, an erroneous display can be prevented by halting the display of the focusing state when the focus detection signal B is below a predetermined level. For this purpose, B×K (where K is a constant) is added to the discrimination conditions (algorithm) of the focusing state by the central processing circuit CPU shown in FIG. 2. When this condition is satisfied, the display is performed. When this condition is not satisfied, the display is halted.

This will be described in more detail with reference again to FIGS. 9 and 10. When the field of view corresponding to the light-receiving section 6'' at the center is denoted by Σb, the magnitude relationships of the three focus detection signals A, B and C do not change and correct discrimination of the focusing state is performed since the focus detection signal B is sufficiently great, in the cases of FIGS. 9(a) and 10(a). Although C>B>A in FIG. 9(b), the display is suppressed since the level of the focus detection signal B is extremely low. In the case of FIG. 10(b), since B=0, display is inhibited and the erroneous display is prevented.

As a method of changing the field of view of the detection by individual light-receiving sections, there may be employed a method in which the size of each of the light-receiving sections is physically or optically changed, and a method in which the signal processing range of the light-receiving section, that is, the substantial field of view is changed by an electrical setting. The latter method may be accomplished by electrically setting a narrow field of view only for the light-receiving section at the center by means of the window function generator WIN which controls the gain of the squaring circuit SQR.

Figure 11:
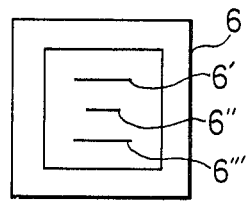
FIG. 11 is a view showing the arrangement of the light-receiving sections of a photoelectric transducer element according to an embodiment of the improvement of the present invention to be described in connection with FIGS. 9 and 10.

FIG. 11 shows the case of the former method. As shown in this figure, of the three light-receiving sections 6', 6'' and 6''' of the CCD 6, the light-receiving section 6'' at the center of the CCD 6 and corresponding to the predetermined focal plane is formed narrower than the other light-receiving sections 6' and 6'''.

In order to apply the CCD 6 having the light-receiving sections 6', 6'' and 6''' of such a configuration to the system shown in FIG. 2, the program content of the programmable logic array PLA2 is changed in the configuration of the timing generator TMGE shown in FIG. 6 to change the timings of the pulse outputs from the terminals e, f, g and h of the programmable logic array PLA2 shown in FIG. 7, in accordance with the change in the size of the light-receiving section 6''.

Figure 12:
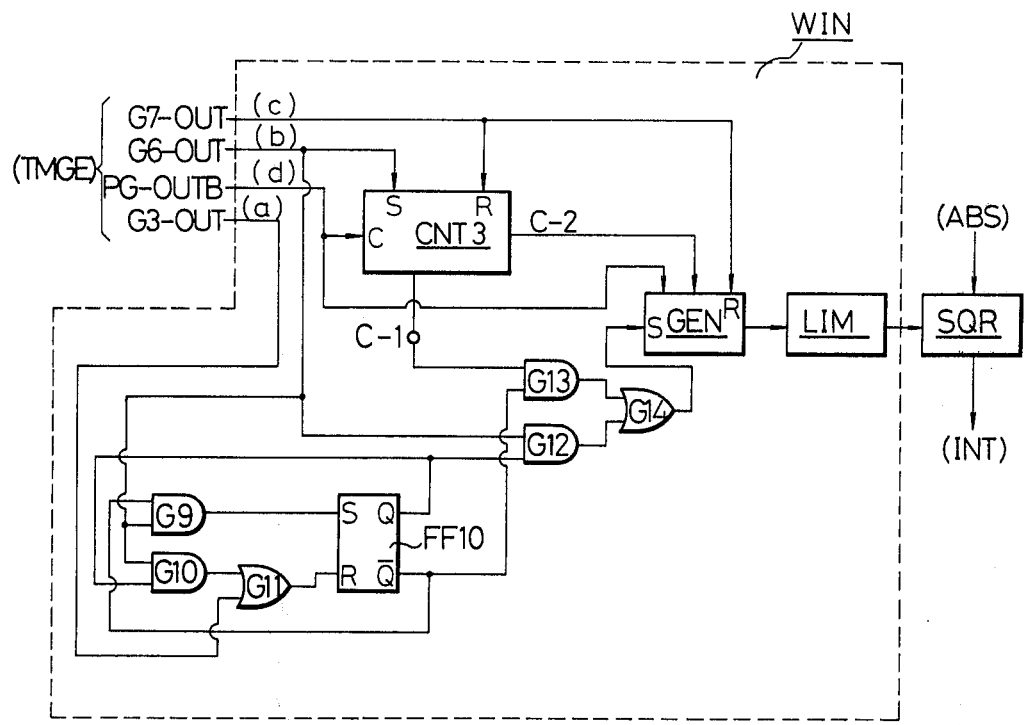
FIG. 12 is a partial circuit diagram showing the configuration of the window function generator in the circuitry shown in FIG. 2 according to another embodiment of the improvement of the present invention to be described in connection wit FIGS. 9 and 10.

FIG. 12 shows the case of the latter method, wherein the field of view for the central light-receiving section 6'' is narrowed by the window function generator WIN. The timing generator TMGE supplies to the window function generator WIN a pulse synchronous with the timing of the shift of charge from the light-receiving sections 6', 6'' and 6''' of the CCD 6 to the analog shift register for charge transfer; a pulse of a timing corresponding to the initial moment and moment of completion of light reception by the light-receiving sections 6', 6'' and 6'''; and a pulse synchronous with the timing of readout from the respective photosensitive elements of the light-receiving sections 6', 6'' and 6'''. This will further be described with reference to the configuration of the timing generator TMGE which is described with reference to FIG. 6. The pulses supplied to the window function generator WIN from the timing generator TMGE are the output pulse from the OR gate G3 (FIG. 7(b); the pulse synchronous with the timing of the shift of charge from the respective light-receiving sections 6', 6'' and 6''' of the CCD 6 to the charge transfer analog shift register); the output pulse from the OR gate G6 (this is the output pulse from the terminals b, f and j of the programmable logic array PLA2 shown in FIG. 6 and corresponds to the moment of initial light reception by the effective photosensitive part excluding the dark current bit); the output pulse from the OR gate G7 (this is the output pulse from the terminals c, g and k of the programmable logic array PLA2 shown in FIG. 6, and corresponds to the moment of completion of light reception by the effective photosensitive part of the respective light-receiving sections 6', 6'' and 6''' of the CCD 6); and a pulse train B from the pulse generator PG (this corresponds to the timing at which the signals of the respective photosensitive elements of the light-receiving sections 6', 6'' and 6''' of the CCD 6 are read out). These pulses are shown by (a)-(d) in FIG. 13.

In the window function generator WIN shown in FIG. 12, a counter CNT3 starts counting in response to the output pulse of the OR gate G6 in FIG. 6 and is reset by the output pulse of the OR gate G7 to count the pulse train B generated by the pulse generator PG. When the signals corresponding to the central photosensitive elements of the light-receiving sections 6', 6'' and 6''' are generated, the counter CNT3 generates an output pulse C-2. The counter CNT3 generates an output pulse C-1 when the signals, corresponding to the initial location of the narrow field of view preset for narrowing the substantial field of view, are generated. AND gates G9 and G10, an OR gate G11 and an RS flip-flop FF10 constitute a circuit for specifying a timing at which the image signal from the central light-receiving section 6'' is read out. In response to the output pulse of the OR gate G3 in FIG. 6, the RS flip-flop FF10 is reset through the OR gate G11. The output pulse of the OR gate G6 is received by the AND gates G9 and G10. Since the Q output and the $\bar{Q}$ output of the RS flip-flop FF10 are fed back to the AND gates G9 and G10, respectively, Q goes to level "1" at the first pulse from the OR gate G6. When the second pulse is generated, that is, when light reception by the central light-receiving section 6'' commences, the Q output is at level "0". When the third pulse is generated, that is, when light reception by the light-receiving section 6' commences, the Q output again goes to level "1". Therefore, the inverted Q output, that is, the $\bar{Q}$ output, is at level "1" only with the output signal from the central light-receiving section 6''. FIG. 13(e) shows the Q output, and FIG. 13(f) shows the count of the counter CNT3. FIGS. 13(g) and 13(h) show the outputs C-1 and C-2 of the counter CNT3. From the above description, it is seen that the output of an AND gate G12 becomes as shown in FIG. 13(i), and the output of an AND gate G13 becomes as shown in FIG. 13(j). These outputs of the AND gates G12 and G13 are both input to a stair step signal generator GEN through an OR gate G14. In response to the pulse train B from the pulse generator PG shown in FIG. 6 at the readout timings of the respective photosensitive elements in the light-receiving sections 6', 6'' and 6''' of the CCD 6, the stair step signal generator GEN generates a stair step signal which is raised by a predetermined level at every two photosensitive elements. In response to the outputs of the AND gates G12 and G13, the stair step signal generator GEN generates a stair step signal in the up mode. In response to the output C-2 of the counter CNT3, that is, the signal representing the center of the respective light-receiving sections 6', 6" and 6"', the stair step signal generator GEN is switched to the down mode and generates a stair step signal in the down mode. When the stair step signal generator GEN starts generating the stair step signal in response to the output of the AND gate G12, the generated signal rises at the initial moment of light reception by the light-receiving section. When the stair step signal generator GEN starts generating the signal in response to the output from the AND gate G13, the signal rises at the timing of the output C-1 of the counter CNT3. Therefore, as shown in FIG. 13(k), the narrow field of view is provided only for the light-receiving section 6". When the corresponding output signal is obtained through a limiter LIM, it becomes as shown in FIG. 13(l) and is the same as the window function shown in FIG. 5E. The practical field of view of the central light-receiving section 6" alone is, thus, substantially narrowed. As has been described above, when the image is at the boundary of the field of view, the value of the focus detection signal B becomes extremely small so that the output is inhibited, preventing erroneous operation.

Figure 13:
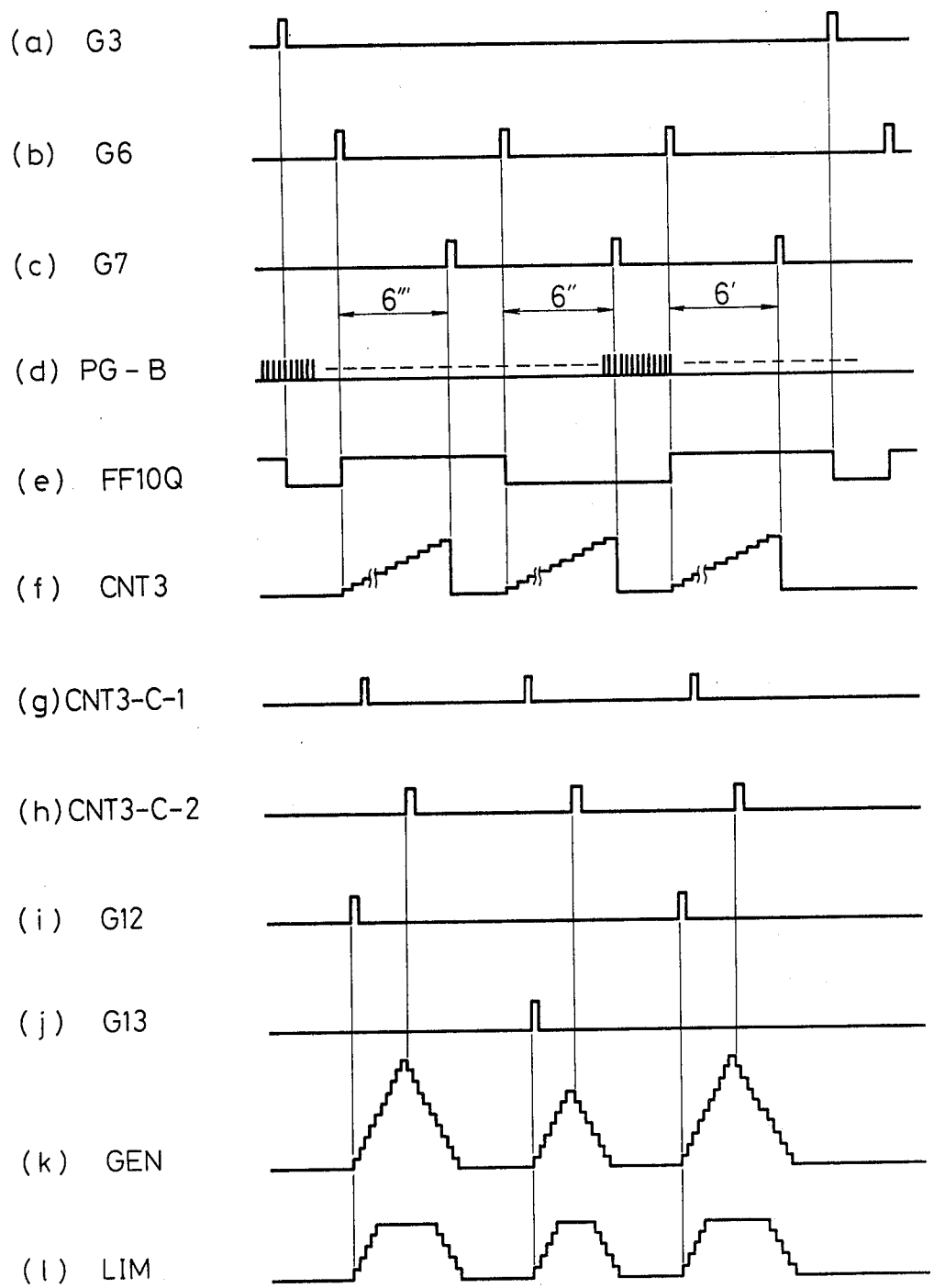
FIG. 13 shows output waveforms of the main circuits in the window function generator shown in FIG. 12.

An example of the central processing circuit CPU will be described which is required for halting the output as described with reference to FIGS. 9 and 10, when the improvements shown in FIGS. 11 and 13 are applied to the circuitry shown in FIG. 2.

Figure 14:
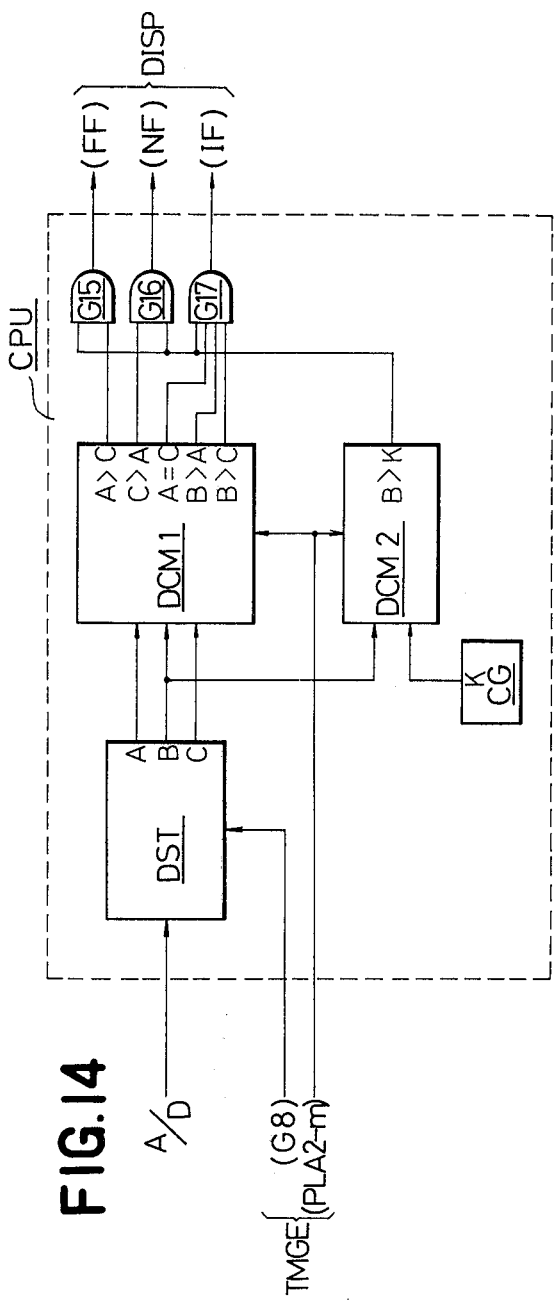
FIG. 14 is a block diagram showing an example of the central processing circuit in the circuitry shown in FIG. 2, which is suitable for embodying the improvements of the present invention to be described in connection with FIGS. 9-13.

Referring to FIG. 14, in response to the output pulse of the OR gate G8 in the timing generator TMGE shown in FIG. 6, a data storage DST stores the most frequently output focus detection signals A, B and C from the A-D converter A/D in correspondence with the light-receiving sections 6"', 6" and 6' and supplies them to digital comparators DCM1 and DCM2. In response to the output pulse from the terminal m of the programmable logic array PLA2 in the timing generator TMGE in FIG. 6, the comparator DCM1 latches the input data and performs the discrimination of A>C, C>A, A=C, B>A and B>C. Similarly, in response to the output pulse from the terminal m of the programmable logic array PLA2, the comparator DCM2 latches the focus detection signal B and the constant K (where K is the constant described with reference to FIG. 10) from a constant generator CG, and performs the discrimination of B>K. An AND gate G15 receives the output "A>C" from the comparator DCM1 and the output of the comparator DCM2, and generates a far-focus signal "FF" at its output terminal. An AND gate G16 receives the output "C>A" of the comparator DCM1 and the output of the comparator DCM2, and generates a near-focus signal "NF" at its output terminal. An AND gate G17 receives the outputs "A=C", "B>A", and "B>C" of the comparator DCM1, and the output of the comparator DCM2, and generates an in-focus signal "IF" at its output terminal.

With the construction of the present invention as described above, all the outputs from the AND gates G15 to G17 are at low level and the display is inhibited unless the condition B>K is satisfied, thereby preventing erroneous detection display.

What we claim is:

1. A focus detecting system for detecting a focusing state of an imaging optical system on an object, comprising:
    (A) first, second and third radiation-sensitive sections disposed at positions substantially corresponding to positons on, in front of and behind, respectively, a predetermined focal plane of said imaging optical system to receive an object image formed by said imaging optical system, said first, second and third radiation-sensitive sections having radiation-sensitive surfaces of definite areas and generating electric signals according to an image formation state of the received image; and
    (B) processing circuit means for processing the electric signals generated by said first, second and third radiation-sensitive sections to generate an output signal representing the focusing state of said imaging optical system on the object, wherein a substantial field of view for detection of said first radiation-sensitive section is disposed at the position substantially corresponding to the predetermined focal plane to receive the image being narrower than the detecting fields of view of said second and third radiation-sensitive sections.

2. A system according to claim 1, wherein the radiation-sensitive surface of said first radiation-sensitive section is physically or optically limited to be narrower than the radiation-sensitive surfaces of said second and third radiation-sensitive sections.

3. A system according to claim 1, wherein the substantial field of view for detection of said first radiation-sensitive section is electrically limited as compared to the detecting fields of view of said second and third radiation-sensitive sections.

4. A system according to claim 3, wherein the substantial field of view for detection of said first radiation-sensitive section is electrically limited by said processing means to be narrower than the detecting fields of view of said second and third radiation-sensitive sections.

5. A system according to claim 4, wherein said processing circuit means includes limiting means for limiting a range of processing, of said processing circuit means, the electric signals generated by said first radiation-sensitive section to be narrower than ranges of processing the electric signals of said second and third radiation-sensitive sections, so that the substantial field of view for detection of said first radiation-sensitive section is electrically limited to be narrower than the detecting fields of view of said second and third radiation-sensitive sections.

6. A system according to claim 5, wherein said processing means further includes a signal processing circuit for processing the electric signals generated by said first, second and third radiation-sensitive sections, a gain of said processing circuit being adjustable; and said limiting means includes a gain control circuit for controlling the gain of said processing circuit so as to limit the range, within which the electric signals generated by said first radiation-sensitive section are normally processed by said processing circuit, to be narrower than the ranges of processing of said second and third radiation-sensitive sections.

7. A system according to claim 6, wherein said signal processing circuit includes a circuit for nonlinearly converting a signal, said gain control circuit being connected to said nonlinearly converting circuit to control a gain thereof.

8. A system according to claim 7, wherein said nonlinearly converting circuit includes a circuit for producing power of the signal.

9. A system according to claim 8, wherein said nonlinearly converting circuit includes a squaring circuit.

10. A system according to claim 7, 8 or 9, wherein the electric signals generated by said first, second and third radiation-sensitive sections are time-serial scanning signals representing a radiation distribution of the image; and said signal processing circuit further includes a change detecting circuit for detecting a change with time in each of said time-serial scanning signals generated by said first, second and third radiation-sensitive sections, said nonlinearly converting circuit being connected to said change detecting circuit to convert nonlinearly an output of said change detecting circuit.

11. A system according to claim 10, wherein said change detecting circuit includes a high-pass filter circuit.

12. A system according to claim 11, wherein said change detecting circuit includes an absolute value circuit for obtaining an absolute value of an output of said high-pass filter circuit, said nonlinearly converting circuit being connected to said absolute value circuit to nonlinearly convert an output of said absolute value circuit.

13. A system according to claim 11, wherein said signal processing circuit further includes an integrating circuit for individually integrating outputs of said nonlinearly converting circuit each output associated with said first, second and third radiation-sensitive sections.

14. A system according to claim 13, wherein said processing means further includes a discriminating circuit for discriminating the focusing state of said imaging optical system on the object on the basis of outputs of said integrating circuit each output associated with said first, second and third radiation-sensitive sections, said discriminating circuit generating the output representing the focusing state.

15. A system according to claim 14, wherein said processing means further includes an output control circuit for limiting the output of said discriminating circuit in accordance with the output of said integrating circuit associated with said first radiation-sensitive section.

16. A system according to claim 15, wherein said output control circuit suppresses the output of said discriminating circuit when the output of said integrating circuit associated with said first radiation-sensitive section is below a predetermined value.

17. A system according to claim 10, wherein said signal processing circuit further includes an integrating circuit for individually integrating outputs of said nonlinearly converting circuit each output associated with said first, second and third radiation-sensitive sections.

18. A system according to claim 17, wherein said processing means further includes a discriminating circuit for discriminating the focusing state of said imaging optical system on the object on the basis of outputs of said integrating circuit each output associated with said first, second and third radiation-sensitive sections, said discriminating circuit generating the output representing the focusing state.

19. A system according to claim 18, wherein said processing means further includes an output control circuit for limiting the output of said discriminating circuit in accordance with the output of said integrating circuit associated with said first radiation-sensitive section.

20. A system according to claim 19, wherein said output control circuit suppresses the output of said discriminating circuit when the output of said integrating circuit associated with said first radiation-sensitive section is below a predetermined value.

21. A system according to claim 6, 7, 8 or 9, wherein said processing means further includes a discriminating circuit for discriminating the focusing state of said imaging optical system on the object on the basis of outputs of said signal processing circuit each output associated with said first, second and third radiation-sensitive sections, said discriminating circuit generating the output representing the focusing state.

22. A system according to claim 21, wherein said processing means further includes an output control circuit for limiting the output of said discriminating circuit in accordance with the output of said signal processing circuit associated with said first radiation-sensitive section.

23. A system according to claim 22, wherein said output control circuit suppresses the output of said discriminating circuit when the output of said signal processing circuit associated with said first radiation-sensitive section is below a predetermined value.

24. A system according to claim 1, 2, 3, 4 or 5, wherein said processing means includes an image formation state detecting circuit for producing an output representing an image formation state of the image received by each of said radiation-sensitive sections in accordance with electric signals generated by said first, second and third radiation-sensitive sections; and a discriminating circuit for discriminating the focusing state of said imaging optical system on the object on the basis of the outputs of said image formation state detecting circuit each output associated with said first, second and third radiation-sensitive sections, said discriminating circuit generating the output representing the focusing state.

25. A system according to claim 24, wherein said processing means further includes an output control circuit for limiting the output of said discriminating circuit in accordance with the output of said image formation state detecting circuit associated with said first radiation-sensitive section.

26. A system according to claim 25, wherein said output control circuit suppresses the output of said discriminating circuit when the output of said image formation state detecting circuit associated with said first radiation-sensitive section is below a predetermined value.

* * * * *

UNITED STATES PATENT AND TRADEMARK OFFICE
CERTIFICATE OF CORRECTION

PATENT NO. : 4,411,504

DATED : October 25, 1983

INVENTOR(S) : TAKAO KINOSHITA, ET AL.

It is certified that error appears in the above-identified patent and that said Letters Patent is hereby corrected as shown below:

On the Title Page, insert:

--[30] Foreign Application Priority Data

October 23, 1980 (JP) Japan ............55-149061--

Column 3, line 13, "wit" should read --with--.

Column 4, line 34, "Focal" should read --Focus--.

Column 5, line 28, "divider" should read --driver--.

Column 13, line 6, "BXK" should read --B > K--

Column 15, line 68, Claim 1, "positons" should read --positions--.

Signed and Sealed this

Seventeenth Day of April 1984

[SEAL]

Attest:

GERALD J. MOSSINGHOFF

Attesting Officer    Commissioner of Patents and Trademarks